United States Patent [19]

Takashima et al.

[11] Patent Number: 5,325,210
[45] Date of Patent: Jun. 28, 1994

[54] SHADING DATA ACCEPTING SYSTEM IN IMAGE READERS

[75] Inventors: Izumi Takashima; Yoshiya Imoto, both of Ebina, Japan

[73] Assignee: Fuji Xerox Co., Ltd., Tokyo, Japan

[21] Appl. No.: 846,013

[22] Filed: Mar. 4, 1992

[30] Foreign Application Priority Data

Mar. 4, 1991 [JP] Japan .................. 3-037368

[51] Int. Cl.⁵ .................. H04N 1/40; H04N 1/38
[52] U.S. Cl. .................. 358/461; 358/463
[58] Field of Search .......... 358/447, 443, 461, 475, 358/463, 498, 474, 471; 382/54; H04N 1/40, 1/38

[56] References Cited

U.S. PATENT DOCUMENTS

| | | | |
|---|---|---|---|
| 4,806,780 | 2/1989 | Yamamoto et al. | 358/461 |
| 4,841,376 | 6/1989 | Yamamoto et al. | 358/461 |
| 4,870,501 | 9/1989 | Yoshida | 358/461 |
| 4,958,240 | 9/1990 | Abe | 358/475 |
| 4,961,117 | 10/1990 | Rumley | 358/461 |
| 5,062,144 | 10/1991 | Murakami | 358/461 |
| 5,179,454 | 1/1993 | Shinada | 358/461 |

FOREIGN PATENT DOCUMENTS 3208181 9/1991 Japan .................. G06F 15/62

Primary Examiner—Edward L. Coles, Sr.
Assistant Examiner—Jerome Grant, II
Attorney, Agent, or Firm—Finnegan, Henderson, Farabow, Garrett & Dunner

[57] ABSTRACT

Because of using as a light source a halogen lamp which is well stabilized in terms of both the quantity of light and the spectral ratio, it is unnecessary to read shading data whenever the reading of an image is initiated. The shading data can be read with a certain margin at the end of a copy job, when power is being given to an image reader or at given time intervals for making shading correction on the basis thereof. Reading the shading data can be carried out with a certain time margin without detriment to FCOT (First Copy Output Time) and CPM (Copy/Minute); enough time is allowed for acceptance of the shading data, so that data of a plurality of lines can be read and fault values, if any, can be removed therefrom. Therefore, the influences of dust, etc., even if present on the white reference plate, can be eliminated. In addition, since it is unnecessary to accept the shading data at the beginning of a copy job, the white reference plate can be located on platen glass on the tail end side rather than on the lead edge side; the white reference plate can be read under the same illuminating conditions as in reading the original document.

7 Claims, 10 Drawing Sheets

SHADING DATA ACCEPTING SYSTEM IN IMAGE READERS

BACKGROUND OF THE INVENTION

This invention concerns a shading data accepting system in an image data reader for reading image data from digital copiers, facsimiles, printers or other hardware.

Conventional shading correction at white levels will now be explained with reference to FIGS. 1(A–C).

A contact type of dot-sequential line sensor 50 is built up of a zigzag array of sensor elements connected with each other, each of said elements comprising five chips, for instance. The read-out video signal is placed under gain and offset controls by a gain control circuit 51 and an offset control circuit 52, respectively, and converted into digital data by an A/D converter 53, which is in turn separated by a multiplexer 54 into respective R, G and B signals. Outputs of a buffer 55 are converted into density data by logarithmic transformation corrected for shading by a subtraction circuit 57 and a memory 58, and placed under gray balance control by an END conversion table 60 for output to an IPS.

The goal of shading correction is to compensate for variations due to the illuminating characteristics of light sources and changes with year and non-uniformity of light source, variations in optical systems resulting from stains oh reflectors, variations in the sensitivity of sensors to pixels, etc. At the beginning of scanning, a white reference plate 41 located on the lead edge side is read out, as typically shown in FIG. 1b, and the readout data is stored in the shading memory 58 after logarithmic transformation. Acceptance of the white reference plate data takes place by sensing that a reader is lying just under the white reference plate 41 by a position sensor 59 and triggering the detected signal to allow the memory 58 to accept the read-out data. Then, the original document is sequentially read out by the line sensor 50 and, after logarithmic transformation, the data stored in the memory 58 is subtracted from the data read at the subtraction circuit for the purpose of shading correction.

Ideally, the light source illuminating the original document should be as large in terms of the quantity of light as possible with its spectral characteristics being flat. Indeed, however, there is unavailable such a light source; that is, currently available light sources give out R, G and B components at considerably different ratios. At one end is a daylight fluorescent lamp whose R to B ratio is relatively small and whose characteristics are flat. Although the fluorescent lamp has the general merits of being less in power consumption, having an R:G:B ratio approximate to 1:1:1 and being more enhanced than a halogen lamp in terms of blue, a heater is required for temperature control, because its quantity of light is considerably variable. Once copying has been initiated, however, that lamp remains lit, so that its temperature rises, only to decrease in the quantity of light. This also holds at a low room temperature; its temperature drops under the influence of air vagaries resulting from scanning, again only to decrease in the quantity of light. Thus, not only is some difficulty involved in keeping the fluorescent lamp at the best temperature (about 45° C.) at which the maximum quantity of light is obtained, but the quantity of light is variable as well. A halogen lamp, on the other hand, is well stabilized in terms of the quantity of light but is far from satisfactory in terms of the R:G:B ratio, esp., in terms of the proportion of B. Accordingly, when it is intended to amplify the components R, G and B separately so as to put the signal strengths of such colors in order, it is required to separate the light into three colors at the analog signal stage and then amplify them separately for compositing. This is particularly true of the use of a contact type of dot-sequential sensor. Even when five chips are used as the line sensor, fifteen (3×5) amplifiers are needed, posing a problem in that the circuit costs much.

Using a rod lens array, the conventional contact type of dot-sequential line sensor has the advantages of being capable of reducing the power of the light source due to its high resolution and brightness and being made compact. However, it has a grave problem in connection with a zigzag array of line sensor chips, correction of a time lag corresponding to a positional deviation between adjacent chips, correction of chip joints, inter-chip differences in characteristics, etc. Another problem arises from the fact that the rod lens array has a very small focal depth;. even a slight separation of the original document from the platen surface renders the image out of focus. For these reasons, such a demagnification type of line-sequential line sensor as illustrated in FIGS. 2(A and B) has been proposed in the art.

As typically shown in FIG. 2a, the demagnification type of line-sequential line sensor is designed to focus image-bearing light from a platen surface 40 onto a CCD line sensor 60 through a demagnification type of optical system 61. As can be best seen from FIG. 2b, this line sensor 60 is built up of three R, G and B sensor elements 60a, 60b and 60c located at given intervals. The sensor elements are each formed of a single chip so that R, G and B signals can be obtained separately without offering such inter-chip variations as found in the case of the contact type of dot-sequential line sensor. This enables the colors to be placed under separate gain controls, thus making it possible to use illuminating hardware ill-balanced between R, G and B, for instance, a halogen lamp. Another advantage of using the demagnification type of optical system for the purpose of image formation is that the focal depth is large enough that the resulting image can be well in focus. In the case of the demagnification type of optical system, however, such a large focal depth itself becomes a problem. In other words, when the white reference plate is positioned on the platen surface, as typically shown in FIG. 1b, dust present on the platen surface, even if slight, forms an image, which is then read-out to add a glitch to the white reference data, so that the image signal readout with pixels corresponding to the dust-carrying portion of the white reference cannot precisely be corrected for shading, giving a defective or streaked output image.

The white reference plate 41, when placed on the platen glass, is usually less stained but, when used with an automatic document feeder (ADF), is likely to be stained by dust entering between it and a movable member 42 located at the left end of the platen so as to allow for smooth discharge of the original document, as illustrated in FIG. 1c. This dust, if remains deposited onto the white reference plate, is particularly detrimental to image quality.

When using a conventional fluorescent lamp, there is a variation in the quantity of light between when the shading data is gleaned and when the image is read, because its quantity of light is unstable. This poses a problem in that "image fogging" or "discrete imaging" occurs as a result of shading correction.

Further, because of being placed on the lead edge side, the white reference plate is read to update the white reference data whenever scanning is initiated. In the mode of copying a small document placed at the end opposite to the register end or copying it continuously on an enlarged scale, however, it is impossible to update the white reference data, because the image reader is kept from returning to the white reference plate whenever scanning is initiated so as to increase the productivity of copies; because of the quantity of light varying in the meantime, the highlight area of the image is fogged or made discrete.

SUMMARY OF THE INVENTION

This invention provides a solution to the above problems.

An object of this invention is to accept accurate shading correction data.

Another object of this invention is to accept shading correction data with a certain time margin.

A further object of this invention is to accept shading correction data under the same illuminating conditions.

A still further object of this invention is to remove fault values out of shading correction data.

The above objects are achieved by the provision of an image reader system which, according to one aspect of this invention, comprises a white reference plate, a line sensor for reading images of said white reference plate and the original, storage means for storing the image data of said white reference plate read out by said line sensor in the form of shading data, correction means for correcting the image data of the original read out by said line sensor on the basis of the shading data stored in said storage means, and control means for controlling line sensor scanning, thereby placing the timing of reading said white reference plate by said line sensor after the job of an image reader has been done.

Preferably, the above control means built in the system according to the first aspect is further designed to place line sensor scanning under control for allowing the above line sensor to read the white reference plate when power is being Given to the image reader and at a given time interval.

Preferably, the system according to the first aspect includes a halogen lamp as a light source for illuminating the original.

Preferably, the system according to the first aspect further includes means for removing fault values out of the shading correction data when reading the white reference plate.

According to another aspect of this invention, there is provided an image reader system characterized by a white reference plate, a light-transmitting platen on which an original document is placed, a line sensor for reading images of said white reference plate and the original document placed on said platen, storage means for storing the image data of said white reference plate read out by said line sensor in the form of shading data, and correction means for correcting the image data of the original read out by said line sensor on the basis of the shading data stored in said storage means, said white reference plate being located at the tail end of said platen at which the reading of the original document by said line sensor is complete.

Preferably, the system according to the second aspect is characterized by including automatic feeder means for feeding the original document automatically.

DESCRIPTION OF THE PREFERRED EMBODIMENT

Figure 3:
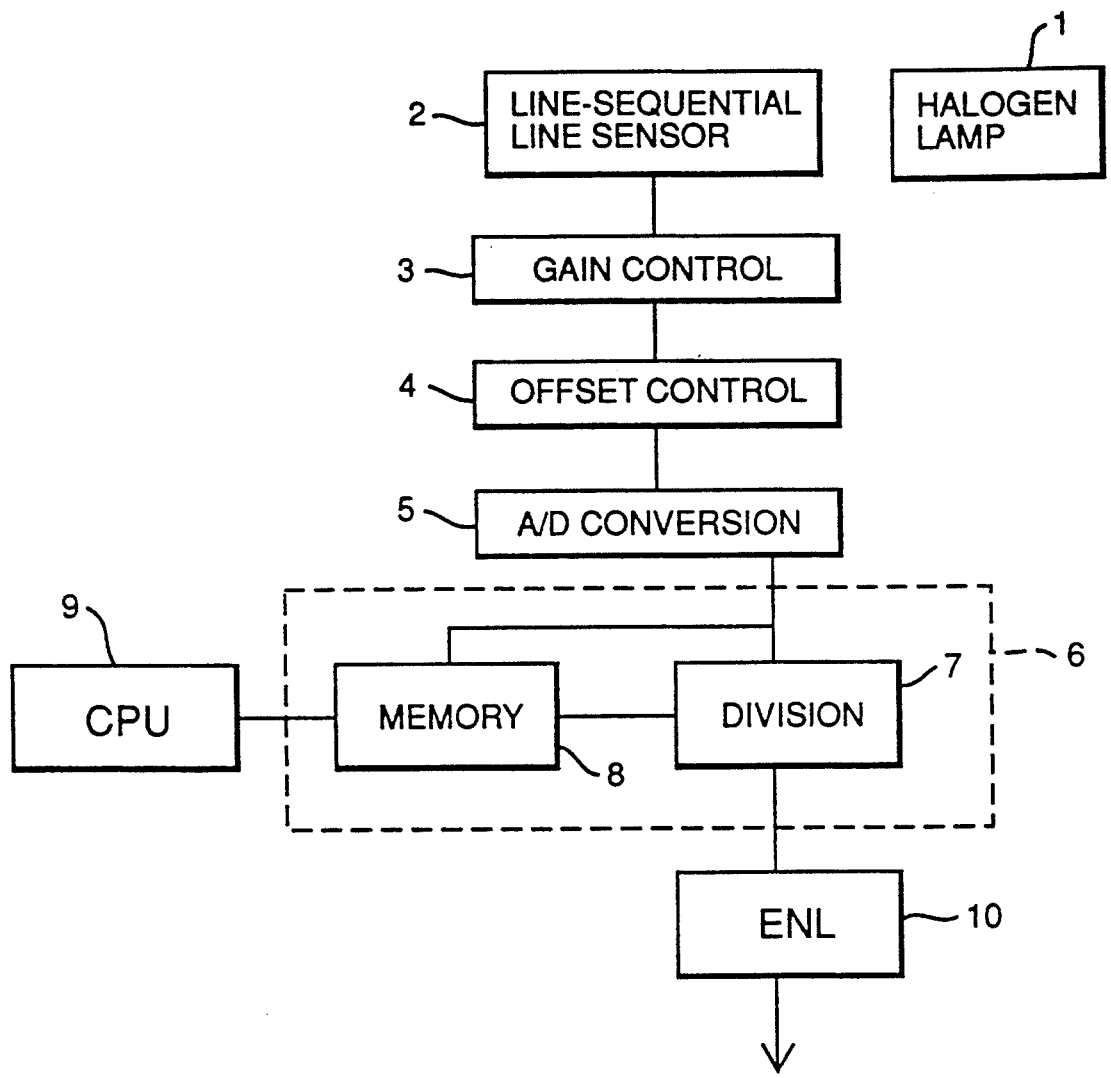
FIG. 3 represents the basic architecture of this invention.

The basic architecture of this invention is illustrated in FIG. 3 in which reference numeral 1 stands for a halogen lamp, 2 a demagnification type of line-sequential line sensor, 3 a gain control circuit, 4 an offset control circuit, 5 an A/D converter, 6 a shading correction circuit, 7 a division circuit, 8 a memory, 9 a CPU and 10 an ENL.

Figure 2A:
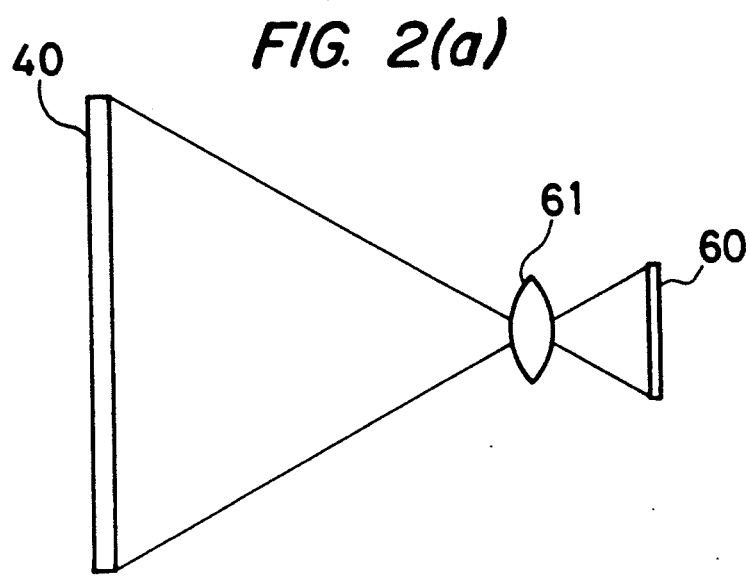
FIG. 2a and 2b illustrates a demagnification type of line sensor.
Figure 2B:
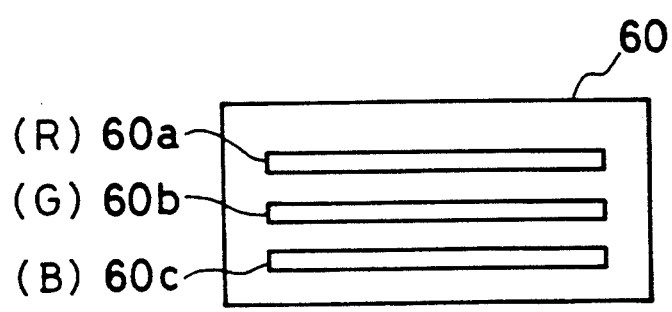

The original document is first illuminated on its surface with the halogen lamp 1 well stabilized in terms of the quantity of light, and the images of the original document are then read by such a demagnification type of line sensor as shown in FIG. 2. Subsequently, the read-out image data are placed under gain and offset controls for each R, G and B and subject to A/D conversion and shading correction. After that, the reflectivity data are converted by ENL 10 into lightness data for feeding to an IPS.

For shading correction, the data read when the .scan unit is moved just below the white reference plate and the CPU 9 gives a command is written in the memory 8 in the form of shading data. This reading takes place through a trigger signal from the CPU 9 when power is being given to the image reader, at the end of job, or at given time intervals controlled by a timer, so that data from, e.g., a plurality of lines can be written in the CPU 9 through the memory 8. After that, the data are processed, as will be described later, to give shading data corresponding to one line, which are then returned to the memory 8. As the job begins to read the image data of the original document, the thus read image data are divided by the data of the memory 8, thereby achieving shading correction.

Figure 4:
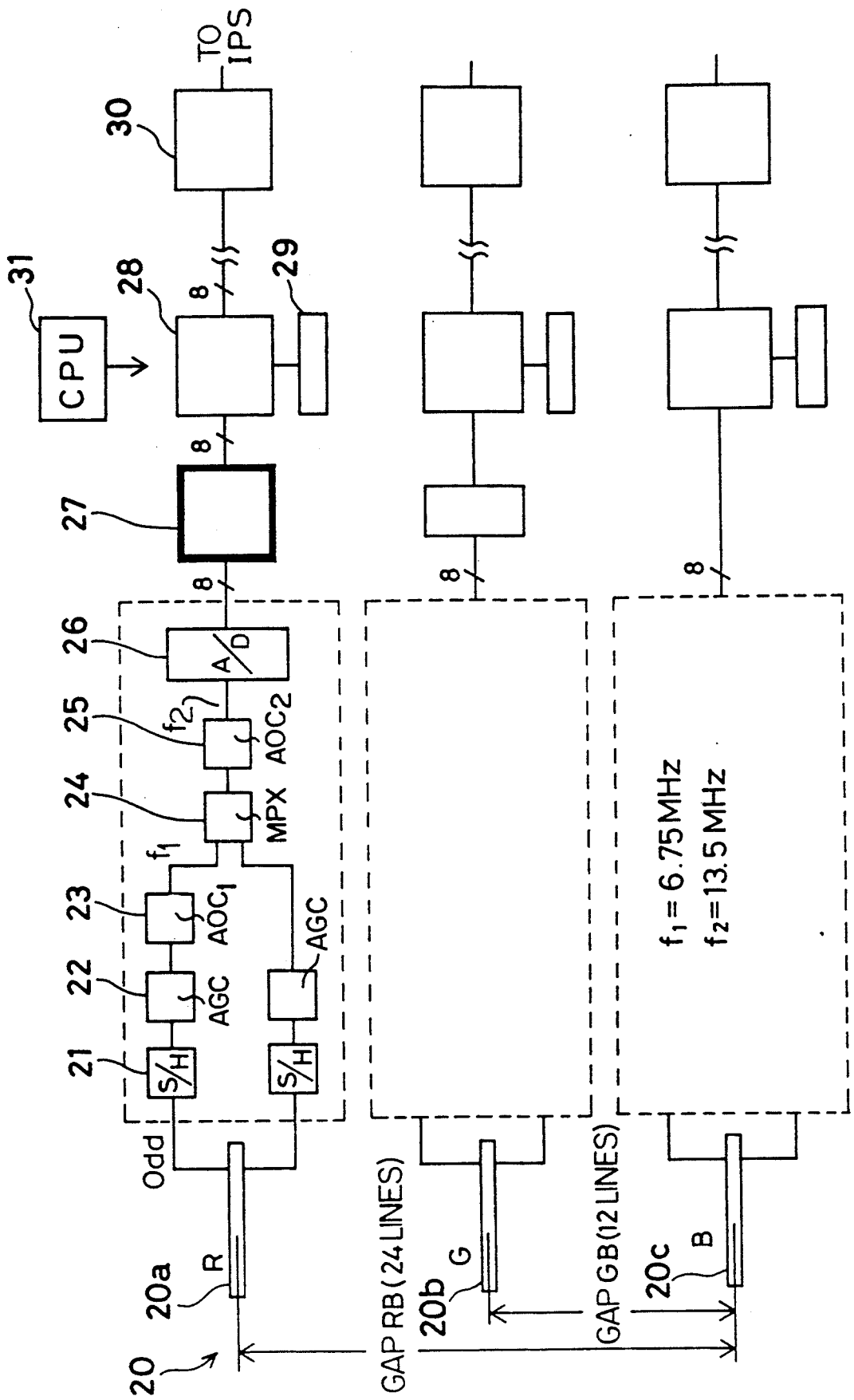
FIG. 4 represents a video circuit for shading correction according to this invention.

FIG. 4 is a block diagram for illustrating how video signal reading and shading correction take place.

As illustrated, a line sensor 20 is built up of sensor elements 20a, 20b and 20c for R, G and B and there are a gap RB corresponding to 24 lines and a gap GB corresponding to 12 lines.

Referring now to how to read R, the signals read sensor element 20a are extracted from both its sides in an alternate odd- and even-numbered order. In other words, outputting the odd- and even-numbered charges from both sides of the sensor element is due to difficulty involved in extracting pixels on the same side of the demagnification type of line sensor, because its pixel density is considerably high. After sample holding, the read-out video signals are placed under gain and offset controls by an AGC 22 and an AOC 23, respectively, so that correction is made between the odd- and even-numbered signals. Then, they are composited by a multiplexer 24, placed under offset control and fed to an A/D converter 26. The frequency of the detected signal is 6.75 MHz in the state divided to odd and even numbers, but compositing allows it to double, say, become 13.5 MHz.

The 8-bit data converted by the A/D converter 26 is corrected at a gap correcting circuit 27 such that it conforms to a B signal in terms of timing. A memory of 512 KB is used for the gap correcting circuit 27, while a memory of 256 KB is used for the gap GB that is half the gap RG.

Upon receipt of a command from a CPU 31, a shading memory 29 reads and stores the data obtained when the reader is moved just below the white reference plate. For copying, the read-out image data is divided by the data stored in the memory 29 in a division circuit 28, thereby accomplishing shading correction. The thus corrected data, because of being reflectivity data, is converted into lightness data by raising it to one-third power by an ENL 30.

Now, how to remove fault values out of the shading data will be explained with reference to FIGS. 5 and 6(A and B).

Figure 5:
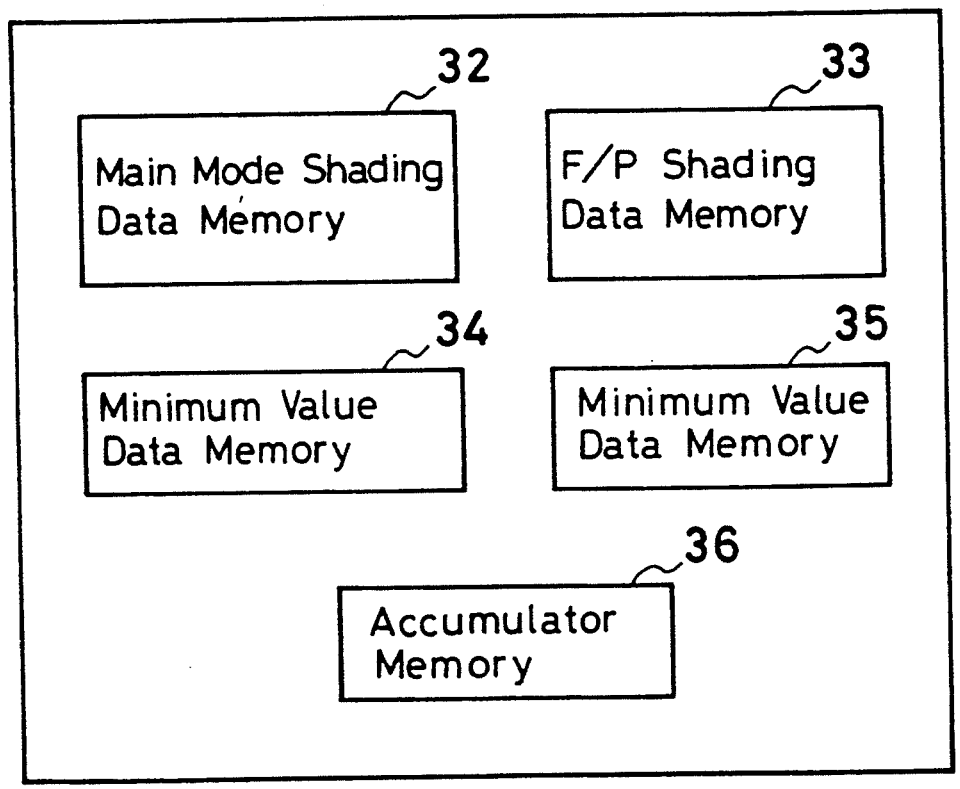
FIG. 5 shows an RAM area of a CPU.
Figure 6A:
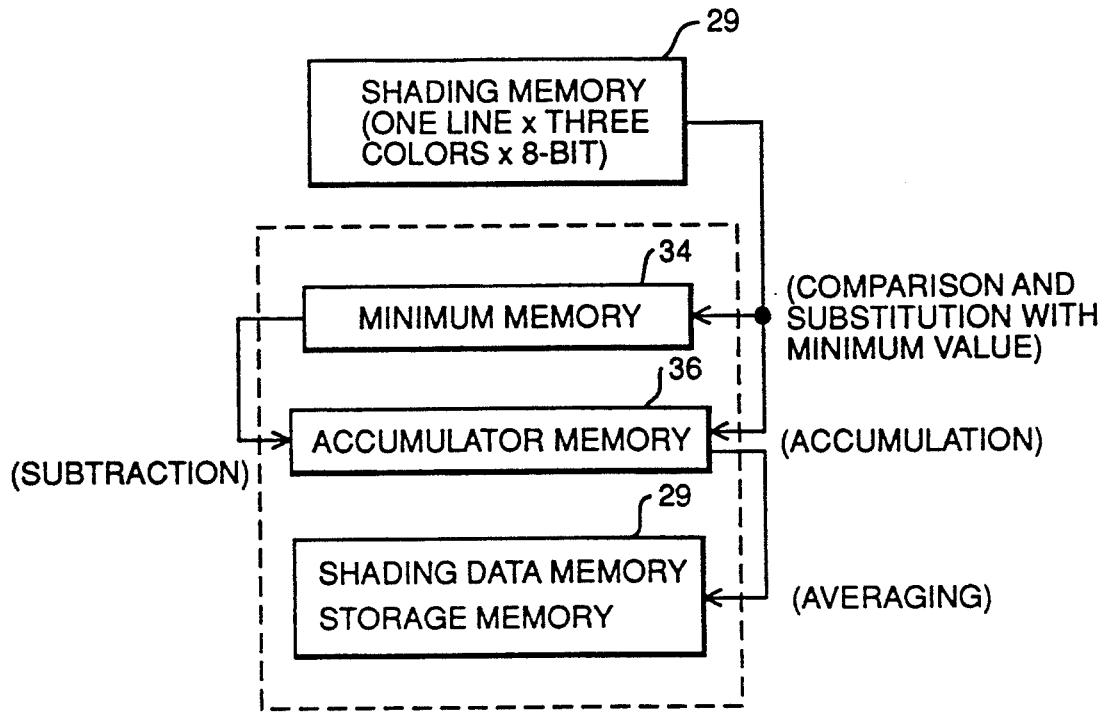
FIGS. 6a and 6b shows how to remove fault values out of the shading correction data.

As can be best seen from FIG. 5, the CPU 31 includes an RAM area divided into sub-areas for a main mode shading data memory 32, an F/P (film projector) shading data memory 33, a minimum value data memories 34 and 35, and an accumulator memory 36. As illustrated in FIG. 6a, as one-line data is written in the shading memory 29 for each of the R, G and B colors, the CPU 31 allows that data to be stored in the minimum value data memory 34 for comparison and substitution with the minimum value for each pixel. At the same time, each line data is added to the accumulator line memory 36 and the data of the minimum value data memory is subtracted from the accumulator memory data (the number of line minus 1) to store it in the form of shading data.

Figure 6B:
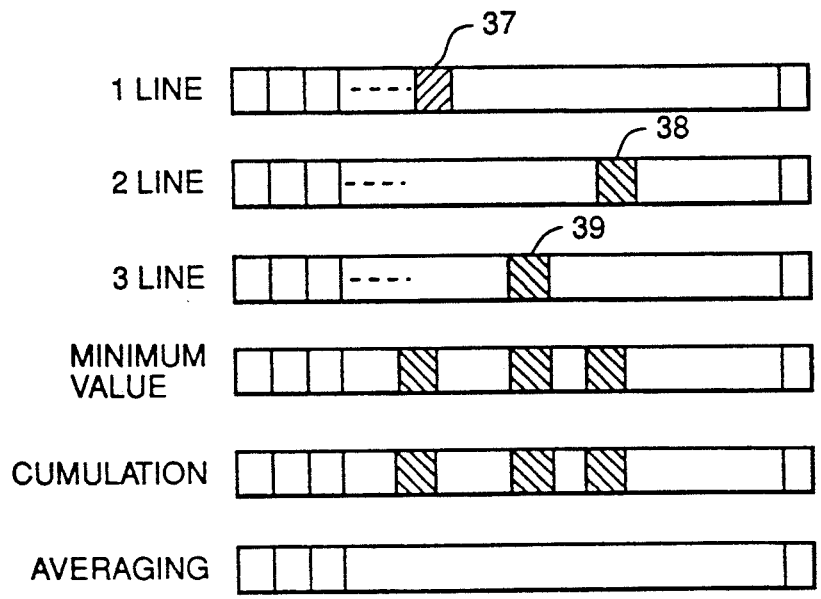

Now consider reading the data of three lines by the above processing, as typically shown in FIG. 6b, and assume that pixel data 37, 38 and 39 whose reflectivities are reduced by dust, etc. are present on the first, second and third lines, respectively. Inasmuch as the three pixel data 37, 38 and 39 have always been stored in the minimum data memory 34 in the form of the minimum value data having low reflectivities and the three pixels have been stored in the accumulator memory as well, subtraction of the former out of the latter results in removal of the three pixels 37, 38 and 39, i.e., fault values. Then, the cumulated value for two lines stored in the accumulator memory is further divided by 2 in a 1-bit shift fashion to give shading data.

Figure 7:
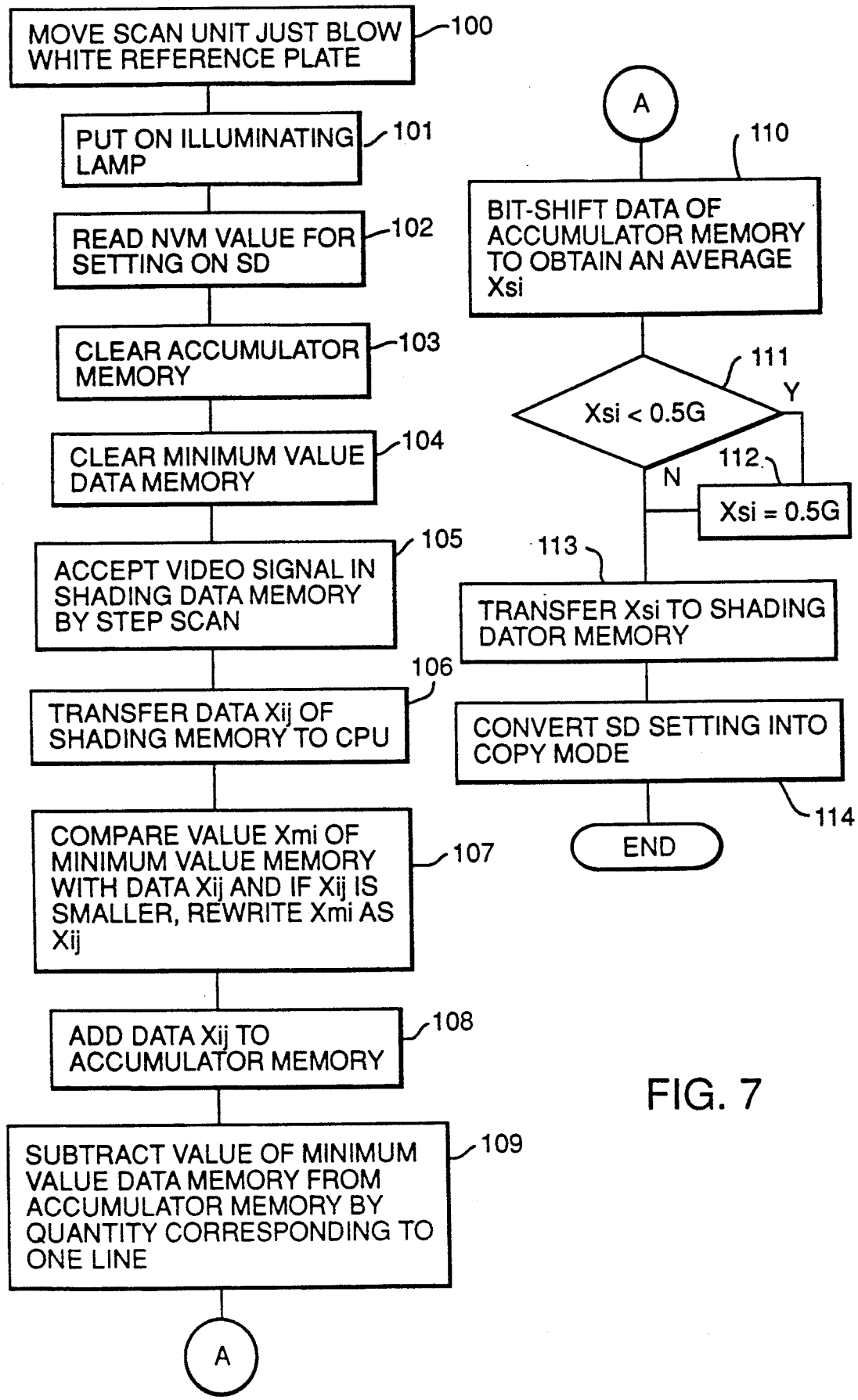
FIG. 7 depicts a process flow of remove fault values out of the shading correction data.

The above processing of fault value removal will now be explained with reference to the flow chart of FIG. 7. The scan unit is moved just below the white reference plate to turn on an illuminating lamp (Steps 100 and 101). Then, an NVM value is read and set on a multiplier register of SD (an LSI for shading correction includes a divider, a memory controller and a multiplier) - because of the white reference plate having not a 100% reflectivity (or having an about 80% reflectivity), a multiply value for multiply-correcting (to correct the white reference reflectivity) and accepting white data has been stored in an NVM (nonvolatile memory) for multiply correction at the time of accepting the white data, and the accumulator and minimum value memories are cleared to $(00)_H$ and $(FF)_H$(Steps 102 and 103). After this, the scan unit is moved stepwise for scanning to accept video signals from the white reference plate in the shading memory and transfer the data Xij to the CPU (Steps 105 and 106). Then, the read-out data Xij is compared with the value of the minimum value data memory and if Xij is smaller than that, then Xmi is rewritten as Xij and the data Xij is added to the accumulator memory (Steps 107 and 108), whereupon the value of the minimum value data memory is subtracted from the accumulator memory by a value corresponding to one line to remove a fault value (Step 109). Then, the data of the accumulator memory is divided by the number of lines in a bit shift fashion to obtain an average Xsi (Step 110). Using this Xsi as a given value, e.g., the target Gain G for the AGC, whether or not it is smaller than 0.5G is judged (Step 111). If Xsi is smaller than 0.5G–this means that there is a fault value for unknown reasons, it is then allowed to assume on 0.5G. If not so, the data Xsi is transferred as such to the shading data memory (Step 113). Then, the SD setting is converted into a copy mode for shading correction (Step 114).

It is understood that how to remove fault values is not limited to that explained in connection with FIGS. 6(A and B); that is, this may also be achieved by simple averaging or median value correction to average median values regardless of the minimum and maximum values. It is also noted that while the above embodiment has been described with reference to the use of the demagnification type of line sensor, this invention may also be applicable to a contact system as well as an ordinary system for making shading correction by division.

Figure 8:
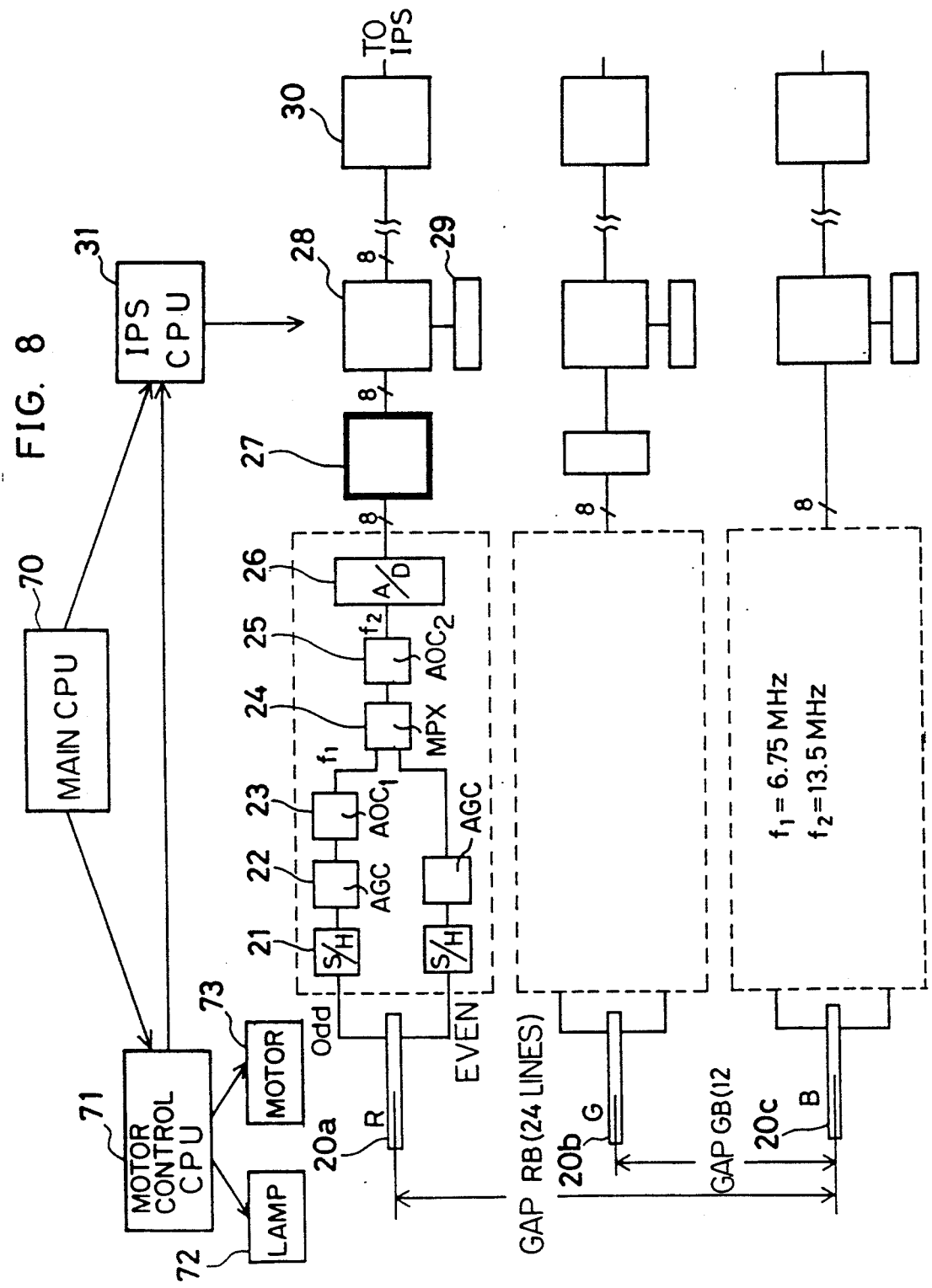
FIG. 8 is a video circuit diagram for illustrating how accepting the shading data is controlled.

FIG. 8 illustrates a video circuit for controlling accepting shading data.

In FIG. 8, shading correction takes place as explained in connection with FIG. 4. An IPS (image processing system) CPU 31 for making shading correction is controlled by a main CPU 70 for placing machine reception under control, and is designed to receive "White Ref" signals from a motor control CPU (IIT—image input terminal—CPU) 71 controlling the IIT for accepting shading data and making shading correction.

Note that one reason for doing shading correction at the job end is that the halogen lamp is so stable that it is unnecessary to glean shading data just before the job start, but, in consideration of possible power source fluctuation, it is not so stable as the desired stability is obtained over several hours only by gleaning the data once when the power is put on, and another reason is that FCOT (first Copy Output Time) is affected at the beginning of the job.

Figure 9:
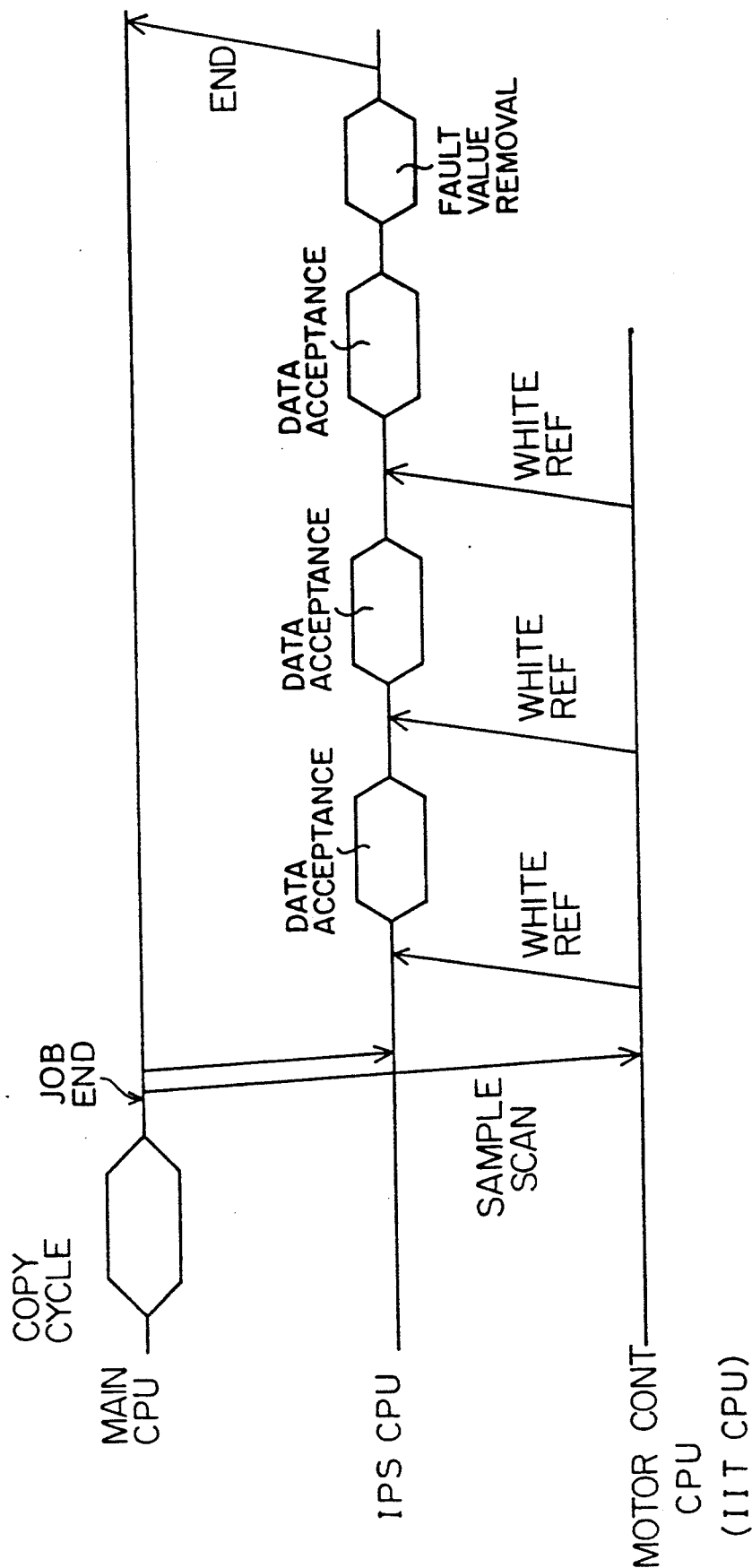
FIG. 9 is a time chart showing how accepting the shading data takes place.

How to make shading correction at the end of job will now be explained with reference to FIG. 9. As can be best seen from FIG. 9, when the main CPU 71 judges one job to have been done from signals received from the IIT, an IOT (image output terminal), etc., a command "Sample Scan" is given to the motor control CPU 71 and, at the same time, the main CPU 20 sends a command "Accept Shading Data" to the IPS CPU 31.

Note that "Sample Scan" is a command meaning "move the line sensor just below the white reference plate and, at the same time, put on the illuminating lamp". As the setting of the IIT has been complete, the "White Ref" signal indicating that the lamp has been put on and reached the reading position is sent from the motor control CPU 71 to the IPS CPU 31. Upon receipt of the "White Ref" signal, the IPS CPU 31 allows the data corresponding to one line to be stored in the memory 29. Then, the motor control CPU 71 moves the line sensor by a distance of, e.g., 1 mm to send the "White Ref" signal to the IPS CPU 31. Upon receipt of this signal, the IPS CPU 31 again accepts the data corresponding to another line and likewise accepts the data corresponding to the third line. Upon having accepted the data corresponding to the three lines, the IPS CPU 31 operates as mentioned above to remove fault values and send an "END" signal indicating that acceptance of the shading data has been complete back to the main CPU.

In this way, the processings of accepting the shading data corresponding to the three lines and removing fault values are achieved. Upon subsequent reading of the image data, shading correction takes place on the basis of this shading data.

Figure 1A:
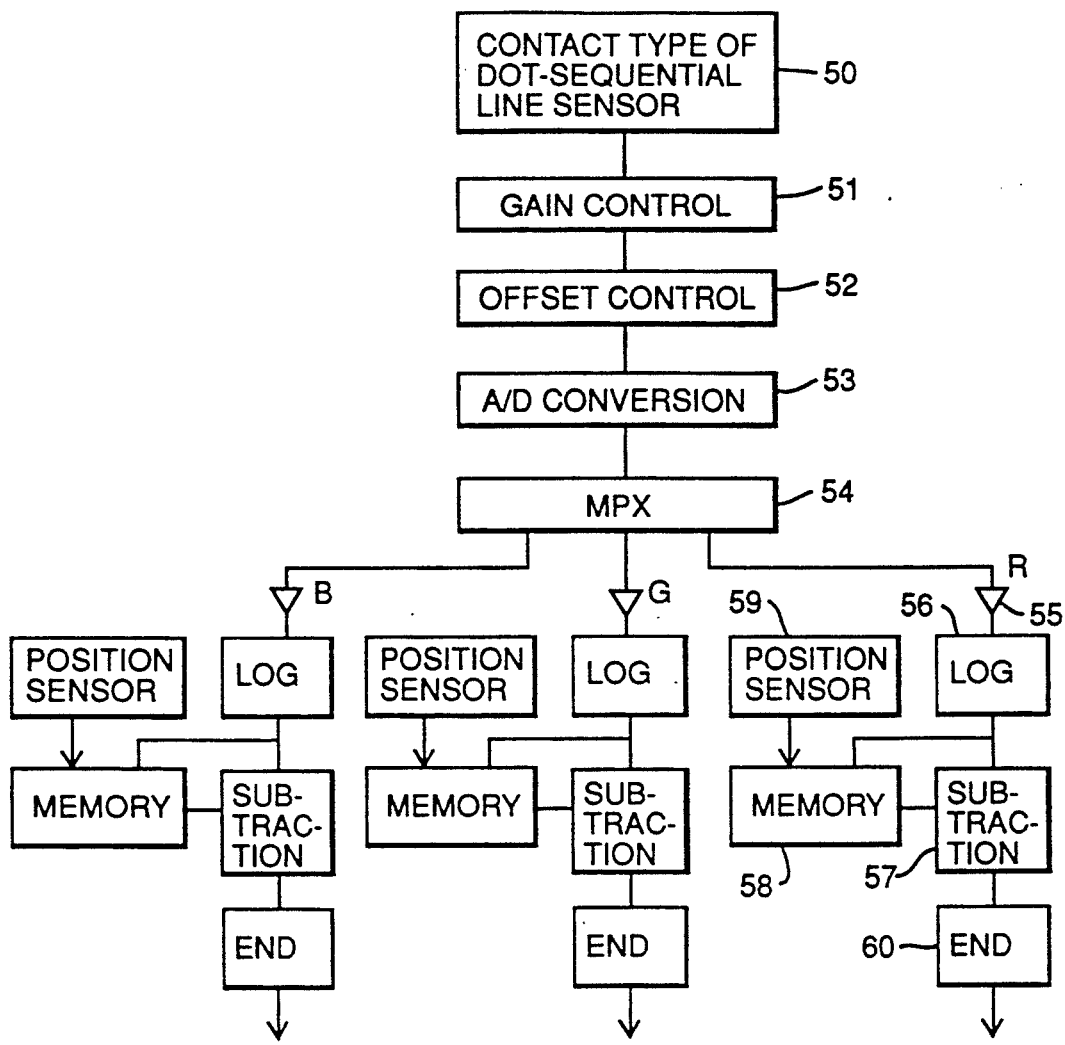
FIG. 1a through 1c illustrates conventional shading correction.
Figure 1B:
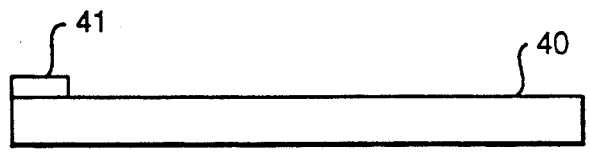
Figure 1C:

As explained in connection with FIG. 1c, the movable member 42 is located at the left end of the platen so as to allow of smooth discharge of documents. Where the white reference plate 41 is provided at this location, there is a difference between the original document and the white reference plate in terms of the illuminating conditions due to a positional difference between the surfaces of the reference plate and platen. Also, since an elongated glass plate is needed for providing it on that location, it is likely to curve as we 11.

Figure 10:
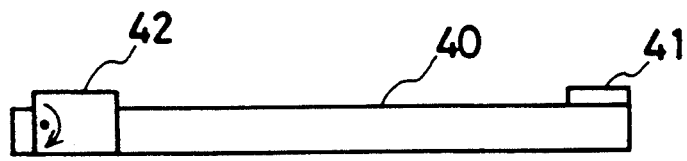
FIG. 10 is a view showing the location of the white reference plate according to this invention.

For that reason, the white reference plate 41 is positioned on the platen glass surface and at the tail end according to this invention, as shown in FIG. 10. This enables the white reference plate to be provided on the same platen glass surface as the original document; that is, the white reference plate and the original document can be illuminated under the same conditions.

According to the shading data accepting system of this invention which, as mentioned above, uses as a light source a halogen lamp stabilized well enough in terms of the quantity of light and enables the white reference plate to be read, with some margin, at the end of job, when power is being given to the image reader or at predetermined time intervals, rather than at the beginning of scan, it is possible to read a plurality of lines without detriment to FCOT (First Copy Output Time), CPM (Copy Volume Per Minute), etc. and remove fault values, whereby accurate shading correction is achieved, giving high-quality images. It is also unnecessary to read the shading data whenever scan is initiated; the white reference plate can be positioned at the tail end, whereby the shading data can be accepted under the same illuminating conditions as is with the original document.

What is claimed is:

1. An image reader system comprising
   a white reference plate,
   a line sensor for reading first image data of said white reference plate and second image data of an original document,
   storage means for storing the first image data of said white reference plate read out by said line sensor in the form of shading data,
   correction means for correcting the second image data of the original document read out by said line sensor on the basis of the shading data stored in said storage means, and
   control means for controlling scanning by said line sensor, whereby reading the first image data of said white reference plate by said line sensor occurs after the reading said second image data of the original document.

2. An image reader system as claimed in claim 1, wherein said control means is further designed to control line sensor scanning such that said line sensor reads the first image data of the white reference plate directly after the image reader is powered up.

3. An image reader system as claimed in claim 1, wherein said control means is further designed to control line sensor scanning such that said line sensor reads the first image data the white reference plate at given time intervals after reading the second image data of the original document not corresponding to the beginning of each and every second image data to be read.

4. An image reader sensor as claimed in claim 1, which comprises a halogen lamp as a light source for illuminating the original document.

5. An image reader system as claimed in claim 1, which further comprises means for removing fault values from the first image data after reading the white reference plate.

6. An image reader system by comprising
   a white reference plate,
   a light-transmitting platen on which an original document is placed,
   a line sensor for reading first image data of said white reference plate and second image data of the original document placed on said platen,
   storage means for storing the first image data of said white reference plate read out by said line sensor in the form of shading data, and
   correction means for correcting the second image data of the original document read out by said line sensor on the basis of the shading data stored in said storage means, said white reference plate being located at a tail end of said platen at which the reading of the original document by said line sensor is completed.

7. An image reader system as claimed in claim 6, which comprises automatic feeder means for feeding the original document automatically.

* * * * *